Feb. 15, 1938.   O. W. GREENE   2,108,482
FLUID PROCESSING APPARATUS
Filed Jan. 16, 1936   2 Sheets—Sheet 1

INVENTOR.
Otto W. Greene
BY Edward H. Lumpston
his ATTORNEY.

Feb. 15, 1938.　　　O. W. GREENE　　　2,108,482
FLUID PROCESSING APPARATUS
Filed Jan. 16, 1936　　　2 Sheets-Sheet 2
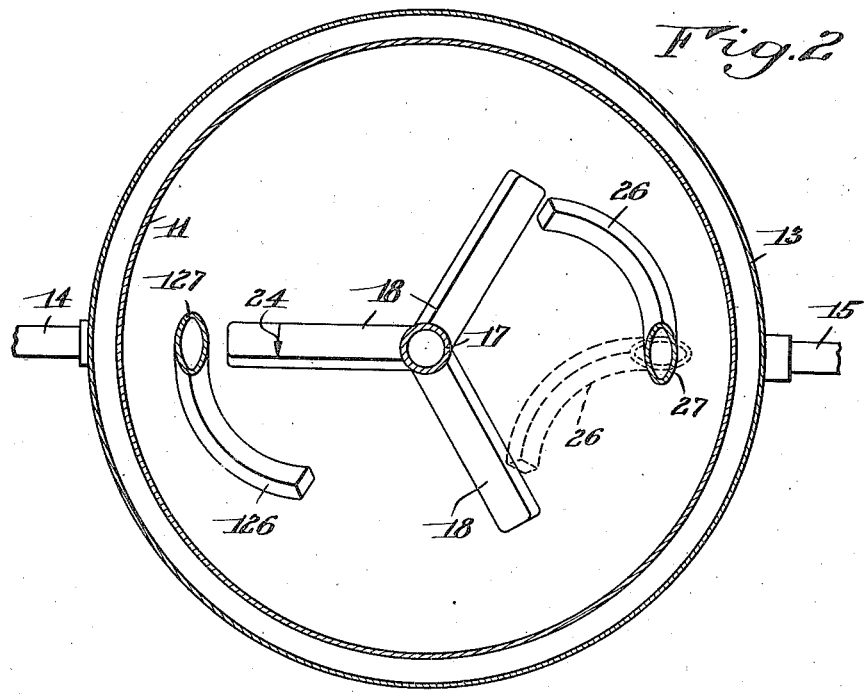
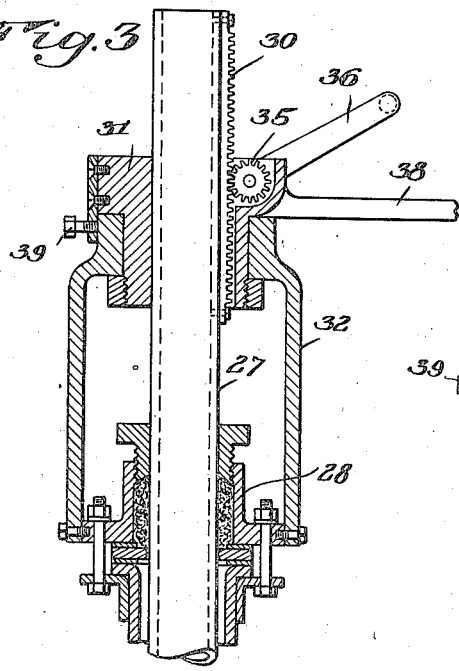
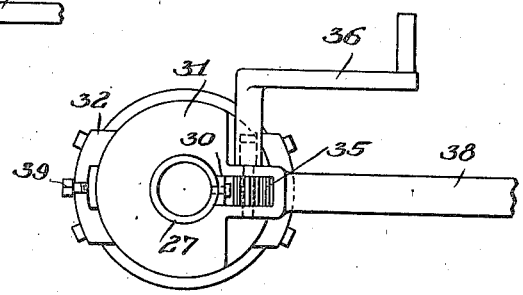
INVENTOR.
Otto W. Greene
BY Edward H. Cumpston
his ATTORNEY.

Patented Feb. 15, 1938

2,108,482

UNITED STATES PATENT OFFICE 2,108,482

FLUID PROCESSING APPARATUS

Otto W. Greene, Elyria, Ohio, assignor to The Pfaudler Co., Rochester, N. Y., a corporation of New York Application January 16, 1936, Serial No. 59,424

6 Claims. (Cl. 259—107)

This invention relates to an apparatus and a method for processing fluid, such as liquids or gases or both. The method and the apparatus are applicable to heating, cooling, or mixing liquids or gases or both, and to forming solutions of soluble substances in liquids or gases, and to the incorporation of gases in liquids, and to various other processes.

An object of the invention is the provision of a generally improved and more satisfactory apparatus, and of an improved and more efficient method for carrying out any or all of the various processing steps above mentioned.

Another object is the provision of apparatus of simple and compact form, so designed and constructed that various different or dissimilar processing steps may be carried out in the same apparatus, without the necessity of removing the fluid from one apparatus to another in order to carry out different dissimilar steps.

A further object is the provision of apparatus of inexpensive form which is particularly efficient for heating, cooling, and mixing operations.

To these and other ends the invention resides in certain improvements and combinations of parts, all as will be hereinafter more fully described, the novel features being pointed out in the claims at the end of the specification.

In the drawings:

Fig. 2 is a horizontal section through the apparatus shown in Fig. 1;

Fig. 3 is a vertical section showing details of the mechanism for adjusting the baffle means, and Fig. 4 is a plan of certain of the parts shown in Fig. 3.

The same reference numerals throughout the several views indicate the same parts.

Figure 1:
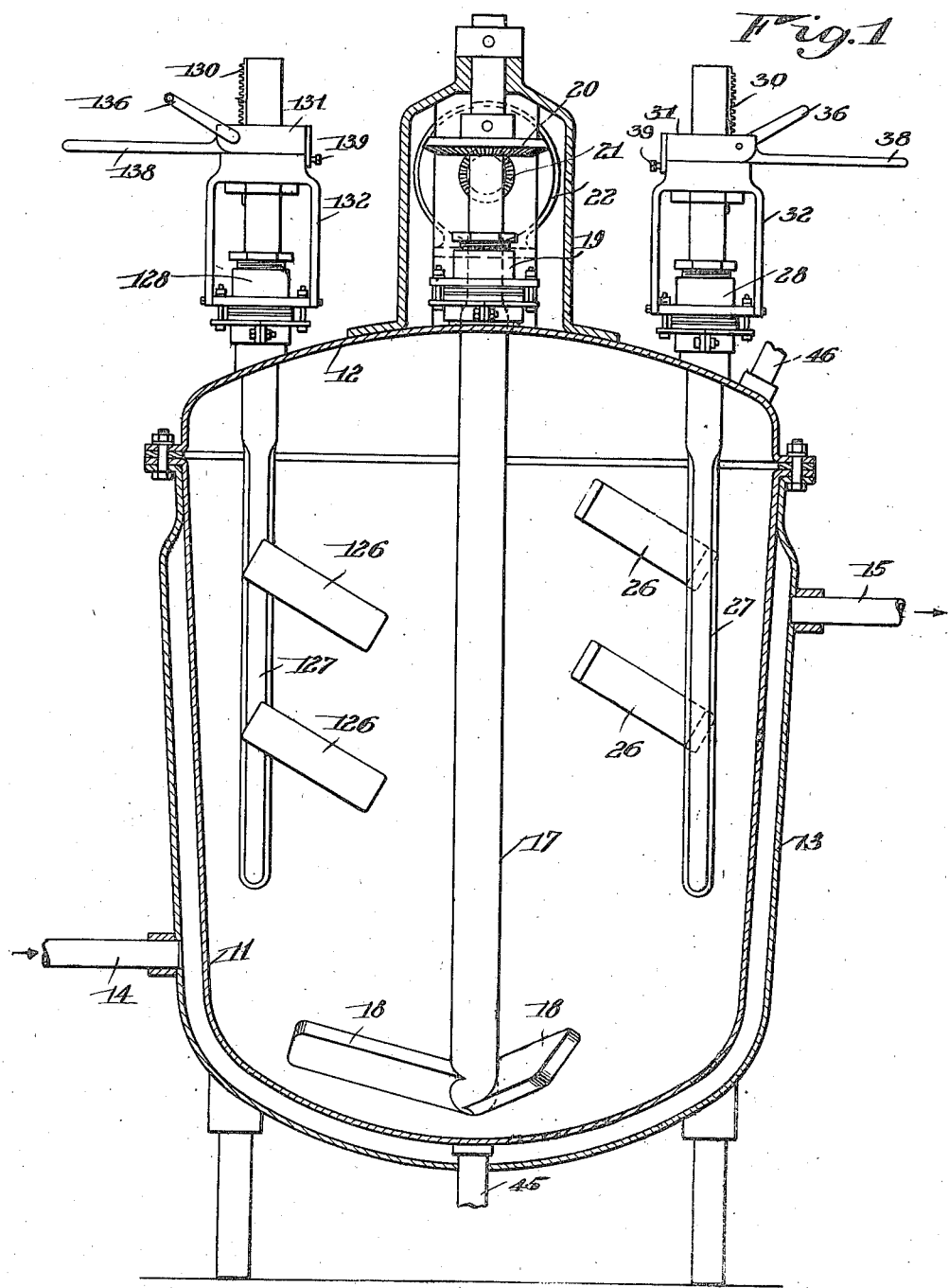
Fig. 1 is a vertical section taken substantially centrally through apparatus constructed in accordance with a preferred embodiment of the invention, with parts shown in elevation.

The apparatus of the present invention will first be described with reference to the drawings, which show one preferred embodiment or example of such apparatus, and the method of the present invention may be best understood in connection with the apparatus.

In its preferred form, the apparatus includes a container 11, which may be completely closed as by means of a fluid tight cover 12. If heating or cooling of the fluid within the container is desired, the container is preferably surrounded at its bottom and sides with a jacket 13 having an inlet 14 and an outlet 15 through which heating or cooling fluid may be passed to heat or cool the bottom and side walls of the container 11 as desired. The bottom of the container is concavely curved by dishing it outwardly and joining the bottom wall with the side wall by a smooth curve as shown.

Extending into the container, and preferably projecting downwardly from the cover 12 thereof, is a rotary shaft 17 extending downwardly to a point near the bottom of the container and there carrying agitating means of any suitable form, such as a plurality of impeller agitator blades 18 which, as shown, may project radially outwardly and obliquely upwardly and which may have broad flat surfaces at an oblique inclination to the axis of the shaft 17, somewhat like the blades of a marine propeller. The agitator head is thus preferably adjacent and conforms generally in curvature with the bottom of the container for more thorough agitation of the contents at the bottom.

The shaft 17 with its agitating means 18 is driven in any suitable manner to cause agitation of the fluid contents of the container 11. In order to maintain fluid tightness of the container, the shaft preferably extends through a stuffing box 19 on the cover 12, and above this stuffing box is provided any suitable means for rotating the shaft such as a bevel gear 20 meshing with another bevel gear 21 on the armature shaft of a motor 22 which preferably has a speed control so that the agitator may be rotated at any desired speed within a wide range.

As the agitator is rotated in the direction of the arrow 24 (Fig. 2), the fluid contents of the tank tend to rotate bodily more or less with the agitator, particularly if the fluid contents be a liquid or semi-liquid of medium or low viscosity. Satisfactory agitation is not produced in the fluid when it thus rotates bodily. In order to break up the rotation of the fluid to an appreciable extent and to cause adequate agitation of the body of fluid, there is provided deflecting baffle means such as the curved blades 26 mounted on an elongated member 27 projecting downwardly into the container through a stuffing box 28. The elongated member 27 may be in the form of a tube, which may be slightly flattened as indicated in Fig. 2, to make it of somewhat elliptical cross section, so as to offer less resistance to the rotary movement of the fluid past the tube when the tube is turned to one position, such as that shown by full lines in Fig. 2, and to offer greater resistance to the rotary movement of the fluid when the tube is turned to a different position, such as that indicated by dotted lines in Fig. 2. The deflecting baffle means 26 may be in the form of one or more (preferably two) arms rigidly mounted on and projecting laterally from the elongated member 27, each of which arms may be, for example, made of a flattened tube to present a broad surface to the rotating body of fluid, as shown in Fig. 1. These members 26 are preferably curved longitudinally, as indicated in Fig. 2, and they are also mounted obliquely on the member 27, as indicated in Fig. 1, so that they incline upwardly from their inner ends which are attached to the member 27 to their outer free ends.

The elongated member 27 is movable from the exterior of the container for the purpose of adjusting the deflecting baffle means 26 to different positions for producing different effects upon the fluid within the container. This may be conveniently accomplished by providing the upper end of the member 27, above the stuffing box 28, with a rack bar 30 slidable longitudinally through a groove in a bearing member 31 which is rotatable in a standard or journal 32 secured to the stuffing box 28 or any other suitable fixed part of the mechanism. The teeth of the rack 30 mesh with the teeth of a pinion 35 mounted on the bearing 31 and operated by a crankhandle 36. By turning the crank 36, the member 27 is raised or lowered to place the baffle members 26 at any desired elevation within the container. This raising or lowering movement does not turn the baffle members. The bearing 31 is provided with a handle 38 which may be turned horizontally to swing the bearing 31 in its standard 32. Such swinging motion is transmitted from the bearing to the member 27, since the rack 30 acts as a key or spline to connect the member 27 non-rotatably with the bearing 31. Thus by operating the handle 38 the elongated member 27 may be turned to swing the members 26 to any desired position within the container, such as either one of the two positions indicated in full lines and dotted lines in Fig. 2, or any intermediate position, or to swing them even further toward the side of the container.

To hold the bearing 31 in any desired position and prevent it from turning accidentally, suitable holding means may be provided such as the set-screw 39 (Fig. 3) which may be tightened to clamp the bearing 31 in its standard 32.

In order to obtain a greater variety of effects, it is frequently desirable to provide the container with a second and separate baffle means which is unlike or dissimilar to the first baffle means, so that either baffle means may be brought into effective use when desired, or both together. The second baffle means may comprise deflecting baffle members 126 mounted on an elongated member 127, and extending obliquely laterally and downwardly, rather than laterally and upwardly as in the case of the members 26. In other respects the members 126 may be similar to the members 26, and the elongated member 127 may be similar to the member 27, and similarly mounted for both vertical movement and rotary movement about its own axis, all as in the case of the elongated member 27. The parts associated with the second elongated member 127, and corresponding to the parts 28 to 39, inclusive, of the first elongated member, are designated in Fig. 1 by the same reference numerals used in connection with the first elongated member except for the addition of one hundred thereto, the rack bar being indicated at 130, the crank at 136, the horizontal turning handle at 138, and so forth.

The fluid or fluids to be treated in the container, whether liquids or gases, may be introduced in any suitable manner, such as through either or both of the conduits 45 and 46, and when the process is completed, the fluid may be suitably removed, as for example through the conduit 45.

If desired, the interior surfaces of the container parts 11 and 12, and also the exterior surfaces of the parts 17, 18, 26, 27, 126, and 127, may be coated with any suitable sanitary, corrosion resisting, non-tarnishing, or other desired coating layer or lining, such as of glass, lead, stainless steel, rubber, or other material having the properties desired for the particular use to which the apparatus is to be put.

In using this apparatus, a great variety of effects can be produced by proper manipulation of a single piece of apparatus or unit, so that complicated or multi-step processes may be carried out all in the same unit, without having to perform one step in one unit and then transfer the fluid to a second unit for another step. The adjustable baffles break up the currents caused by the impeller agitator, and produce thorough agitation and mixing throughout the whole or any desired part of the container, and, when desired, produce turbulence at the surface of liquid within the container so that a gas which may be present above the liquid may be easily incorporated or dissolved in the liquid. By raising the baffle members to a point near the surface of the liquid, one kind of turbulent effect is produced, particularly suitable for gas incorporation. By lowering the baffle members further down into the body of the liquid, less surface turbulence is produced, but greater intermixing and agitation of the body of liquid as a whole is produced. By turning the baffle members to bring them closer to the walls of the tank, less effect or a negligible effect is produced, while by turning them to project obliquely toward the center of the container, a greater displacing or deflecting effect is produced. Certain mixing effects can best be obtained by the use of the upwardly extending baffle members 26, with the other baffle members 126 turned aside to a substantially ineffective position, while other mixing effects can best be produced by the effective use of the downwardly extending baffle members 126, with the other baffle members 26 turned aside to a substantially ineffective position. Thus it is seen that the apparatus has great flexibility in use, and is capable of being employed efficiently in many different processes.

Merely as showing one of many possible examples of the way in which this apparatus may be used, let it be assumed that a finished product is to be produced by first heating a small quantity of liquid, then adding a quantity of a different liquid thereto and immediately and thoroughly mixing it with the heated first liquid, then the mixture of the two liquids is to be heated or cooled to a different temperature, and then a gas is to be absorbed or dissolved in this liquid mixture which has been brought to the right temperature. Heretofore, it has ordinarily been necessary to transfer the liquid or liquids from one piece of apparatus to another between various steps of a complicated process such as this, but with the present apparatus, no such transfer is necessary, as the entire process can be carried out in the one piece of apparatus. In the example cited, a small quantity of liquid is first introduced into the container, a supply of steam, hot water, or other suitable heating agent is introduced into the jacket around the container, and the impeller agitator 18 is set in operation. If the quantity of liquid within the container is small, it may be advantageous to move all of the baffles to a substantially ineffective position and to rotate the impeller agitator in such a manner as to get the liquid to revolving within the container as rapidly as possible. Centrifugal force will then force the small body of liquid up the sides of the container to a considerable degree facilitated by the curvature of the container bottom and the cooperating form of the agitator, thus increasing the area of surface contact of the body of liquid with the heated bottom and side walls of the container and increasing the speed of heating.

When the heating of this liquid is finished, the next liquid material is added to the container and one or both of the baffle means are adjusted to interfere with or reduce the motion of the liquid caused by the impeller agitator 18, thus deflecting the liquid, causing criss-cross currents therein, and promoting the rapid and thorough mixing of the two liquids with each other into a single homogeneous mixture.

When the mixing is completed, suitable heating or cooling fluid is introduced into the jacket around the container to heat or cool the contents to the desired temperature. Then the gas to be absorbed or incorporated into the liquid mixture is introduced, as through the conduit 46, and the baffle means are adjusted to cause violent agitation at the surface of the liquid, creating vortexes and eddies which rapidly incorporate the gas in contact with the surface of the liquid. This gas incorporation is accomplished effectively even though the gas is merely in a body above the liquid, and it is not necessary to introduce the gas in such a manner that it will bubble up through the liquid as has sometimes been found necessary heretofore. After sufficient gas has been absorbed into the liquid, the baffle means are again adjusted to give less vortex action or violent agitation at the surface of the liquid and to produce a more thorough mixing throughout the body of liquid as a whole, which mixing is continued so long as desired.

The foregoing example is but one of many which could be cited to show the flexibility and efficiency of this improved apparatus. It is now seen that the invention includes an improved method as well as improved apparatus, which method comprises, among other things, the novel and advantageous features of rotating a body of fluid and deflecting portions of the rotating body not merely inwardly toward the axis or center of rotation, but also obliquely along the axis in one direction or another. This kind of deflection is found to be particularly suitable for accomplishing thorough mixing of the component parts of the fluid, and also for breaking up the surface of the fluid (if the fluid happens to be a liquid) to produce vortexes and swirls therein so that a gas may be more efficiently absorbed and incorporated. Other improved and novel features of the present method will be obvious from a careful consideration of the use of the present apparatus.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Fluid processing apparatus comprising a container for holding fluid, agitating means for moving the fluid within the container, a plurality of dissimilar baffle means within said container, one shaped to deflect fluid upwardly, another shaped to deflect fluid downwardly, and means operable from the exterior of said container for separately adjusting the position of each of said dissimilar baffle means.

2. Fluid processing apparatus comprising a container for holding fluid, agitating means for moving the fluid within the container, a plurality of dissimilar baffle means within said container, one shaped to deflect fluid upwardly, another shaped to deflect fluid downwardly, each of said dissimilar baffle means being separately adjustable from a substantially ineffective position within said container to an effective position therein, and means operable from the exterior of said container for adjusting the position of each of said baffle means therein.

3. Fluid processing apparatus comprising a container for holding fluid, agitating means for moving the fluid within the container, an elongated member in the form of a flattened hollow tube projecting into said container from the exterior thereof, and a curved baffle blade also in the form of a flattened hollow tube mounted on and projecting laterally from said elongated member.

4. Fluid processing apparatus comprising a container for holding fluid, agitating means for moving the fluid within the container, an elongated member projecting into said container from the exterior thereof, baffle means mounted on and projecting laterally from said elongated member within said container, a bearing member rotatable with respect to said container, said elongated member passing through said bearing member in non-rotatable but longitudinally slidable connection therewith, means for rotating said bearing member to produce corresponding rotary adjustment of said elongated member, a series of rack teeth running longitudinally along said elongated member, pinion means mounted on said bearing member for meshing with said rack teeth, and means for turning said pinion means to adjust said elongated member in a longitudinal direction.

5. Fluid processing apparatus comprising a container for holding fluid, agitating means for moving the fluid within the container, two elongated baffle holding elements spaced from each other and both having portions arranged approximately vertically within the container, each of said elements being mounted for both longitudinal movement and rotary movement independently of the other element, a baffle arm mounted on one of said elements within said container, and another baffle arm mounted on the other of said elements within said container, each of said baffle arms being elongated and curved longitudinally and extending generally laterally from its point of attachment with its element to a free end, one of said baffle arms pointing obliquely upwardly and the other of said arms pointing obliquely downwardly.

6. Apparatus according to claim 5, in which at least one of said baffle arms is in the form of a flattened tube.

OTTO W. GREENE.